United States Patent
Zheng et al.

(10) Patent No.: US 8,019,758 B2
(45) Date of Patent: Sep. 13, 2011

(54) GENERATION OF A BLENDED CLASSIFICATION MODEL

(75) Inventors: Zijian Zheng, Bellevue, WA (US); Frederic Behr, Kirkland, WA (US); Pyungchul Kim, Sammamish, WA (US); Steven Fox, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 839 days.

(21) Appl. No.: 11/157,553

(22) Filed: Jun. 21, 2005

(65) Prior Publication Data

US 2006/0288038 A1 Dec. 21, 2006

(51) Int. Cl.
*G06F 17/00* (2006.01)
(52) U.S. Cl. ........................................ 707/736
(58) Field of Classification Search .................. None
See application file for complete search history.

(56) References Cited

U.S. PATENT DOCUMENTS

| | | | | |
|---|---|---|---|---|
| 5,765,149 | A * | 6/1998 | Burrows | 707/5 |
| 6,078,916 | A * | 6/2000 | Culliss | 707/5 |
| 6,643,646 | B2 * | 11/2003 | Su et al. | 707/6 |
| 6,772,150 | B1 * | 8/2004 | Whitman et al. | 707/6 |
| 6,970,863 | B2 * | 11/2005 | Cragun et al. | 707/3 |
| 7,181,438 | B1 * | 2/2007 | Szabo | 707/2 |
| 7,305,390 | B2 * | 12/2007 | Bowman et al. | 706/45 |
| 2002/0022956 | A1 * | 2/2002 | Ukrainczyk et al. | 704/9 |
| 2003/0172075 | A1 * | 9/2003 | Reisman | 707/10 |
| 2004/0083211 | A1 * | 4/2004 | Bradford | 707/3 |

OTHER PUBLICATIONS

Smyth, Barry, Jill Freyne, Maurice Coyle, Peter Briggs and Evelyn Balfe, I-SPY—Anonymous, Community-Based Personalization by Collaborative Meta-Search, Proceedings of the 23rd SGAI International Conference on Innovative Techniques and Application of Artificial Intelligence, Oxford, UK, Dec. 15-17, 2003 I-SPY article is available at http://www.csi.ucd.ie/UserFiles/publications/1125325052930.pdf.*
Fabio Crestani, et al., "Is This Document Relevant? . . . Probably": A Survey of Probabilistic Models in Information Retrieval, ACM Computing Surveys, vol. 30, No. 4, Dec. 1998.*
Jaime Callan, Distributed Information Retrieval, Chapter 5 in Advances in Information Retrieval, Kluwer Academic Publishers, pp. 127-150 (2000).*
Wenxian Wang et al., Concept Hierachy Based Text Database Categorization in a Metasearch Engine Enviroment, IEEE (2000).*
Thorsten Joachims, Optimizing search engines using clickthrough data, KDD '02 Proceedings of the eighth ACM SIGKDD International conference on Knowledge discovery and data mining, ACM New York, NY, (2002).*

* cited by examiner

*Primary Examiner* — Christyann Pulliam
(74) *Attorney, Agent, or Firm* — Westman, Champlin & Kelly P.A.

(57) ABSTRACT

Methods for updating an information retrieval system are disclosed. In one embodiment, search terms affiliated with mappings or associations that represent a connection of relevancy between a query and an asset are pushed as content updates to a client system (e.g., as new updates or utilized to replace older data). The search terms are inserted (e.g., inserted as metadata) into corresponding content (the content associated with the asset). In this manner, content-searching data can be updated (e.g., remotely updated) as frequently as desired, even periodically, or selectively as new manually and/or automatically derived data becomes available. In another embodiment, the update data is already built into the content when it is delivered to a client machine. Other disclosed embodiments pertain to methods for generating a data mining classification model that is a blended representation of associations (e.g., query-asset associations) having different characteristics and/or different originating sources.

17 Claims, 6 Drawing Sheets

| QUERY | ASSET |
|---|---|
| CONFIGURE FIREWALL | HOW TO CONFIGURE FIREWALL |
| FIREWALL | HOW TO CONFIGURE FIREWALL |
| FIREWALL | HOW TO CONFIGURE FIREWALL |
| CONFIGURING MY FIREWALL | HOW TO CONFIGURE FIREWALL |
| CONFIGURE MY FIREWALL | HOW TO CONFIGURE FIREWALL |
| FIREWALL | HOW TO CONFIGURE FIREWALL |
| FIREWALL AND SECURITY | HOW TO CONFIGURE FIREWALL |
| HOW TO CONFIGURE FIREWALL | HOW TO CONFIGURE FIREWALL |
| HELP WITH CONFIGURING FIREWALL | HOW TO CONFIGURE FIREWALL |
| FIREWALL, CONFIGURATION | HOW TO CONFIGURE FIREWALL |

GENERATION OF A BLENDED CLASSIFICATION MODEL

BACKGROUND

The material in the following section is merely provided for general background information and is not intended for use as an aid in determining the scope of the claimed subject matter.

Search engines are now commonplace in many software applications, both server-based and client side. For example, search engines may be used for searching for text strings in applications such as word processors, for searching for help in sophisticated software as varied as spreadsheets and operating systems, or for searching for uniform resource locator (URL) references and other web-based documents. Since sets of documents can be extremely large, and since any one search engine may have access to multiple document sets, the sheer volume of relevant documents retrieved by a search can be very large.

A list of documents returned in response to a user query should preferably be sorted by relevance in the context of the corresponding search terms. The effectiveness of any one search may be abstractly judged by whether the top few returned documents include the document(s) actually sought by the user. This organization of search results makes it easier for a user to select the documents that he or she believes have the greatest relevance to the search.

Recently, search engines have been augmented with classifiers that support a retrieval of documents with high relevance. Such classifiers are commonly implemented based on training data reflective of any of a variety of different types of user feedback. For example, some classifiers account for factors such as, but not limited to, click patterns (i.e., "click-throughs), explicit user satisfaction ratings (i.e., "explicit feedback"), previous user search history, search context and/or search entry points (i.e., where the search started). The leveraging of these and/or other types of feedback into the searching process enables some improvement as to the determination of which documents are likely to be most relevant for a particular user query. Search classifiers are sometimes evaluated with "test sets" that are typically collected from click-through data and/or explicit user feedback distinct from the data used for training.

The effectiveness of a classifier is generally contingent upon the quality and quantity of underlying training data. It is common for a system to have access to multiple sets of training data, often times from different sources. Some sets of data may even have different characteristics or qualities as compared to another. It becomes a challenge to create a classifier that blends training data in a way that will support accurate and effective searching.

Reliance on classifier models to augment search performance is particularly effective for improving server-side search relevance, where trends can be dynamically monitored and accounted for based on numerous searches received from many searching sources. However, not all search environments enjoy the same situational advantages. Client-side searches, for example, have traditionally been conducted based on a set of keywords that are associated with each document. It is not uncommon for an individual, such as an author, to manually associate a document with relevant keywords to be used subsequently for identification. Thus, the client-side searching process often involves matching search terms with keywords. Under these conditions, the identification of a relevant document is contingent upon a nexus between the perspective of the individual(s) that selected keywords and that of the user selecting search terms. It is not uncommon for a relevant document to be missed because there is not a meeting of the minds in terms of how the individual(s) and user perceive a particular class of subject matter.

SUMMARY

This summary is provided to introduce in a simplified form some concepts, which are described below in the Detailed Description. This Summary is not intended to identify key features or essential features of the claimed subject matter, nor is it intended for use as an aid in determining the scope of the claimed subject matter.

In one embodiment, a computer-implemented method includes training a data mining classification model to statistically account for query-to-asset associations. This data mining classification model can be utilized as a component of an information retrieval system.

DETAILED DESCRIPTION OF ILLUSTRATIVE EMBODIMENTS

I. Exemplary Computing Environment

Figure 1:
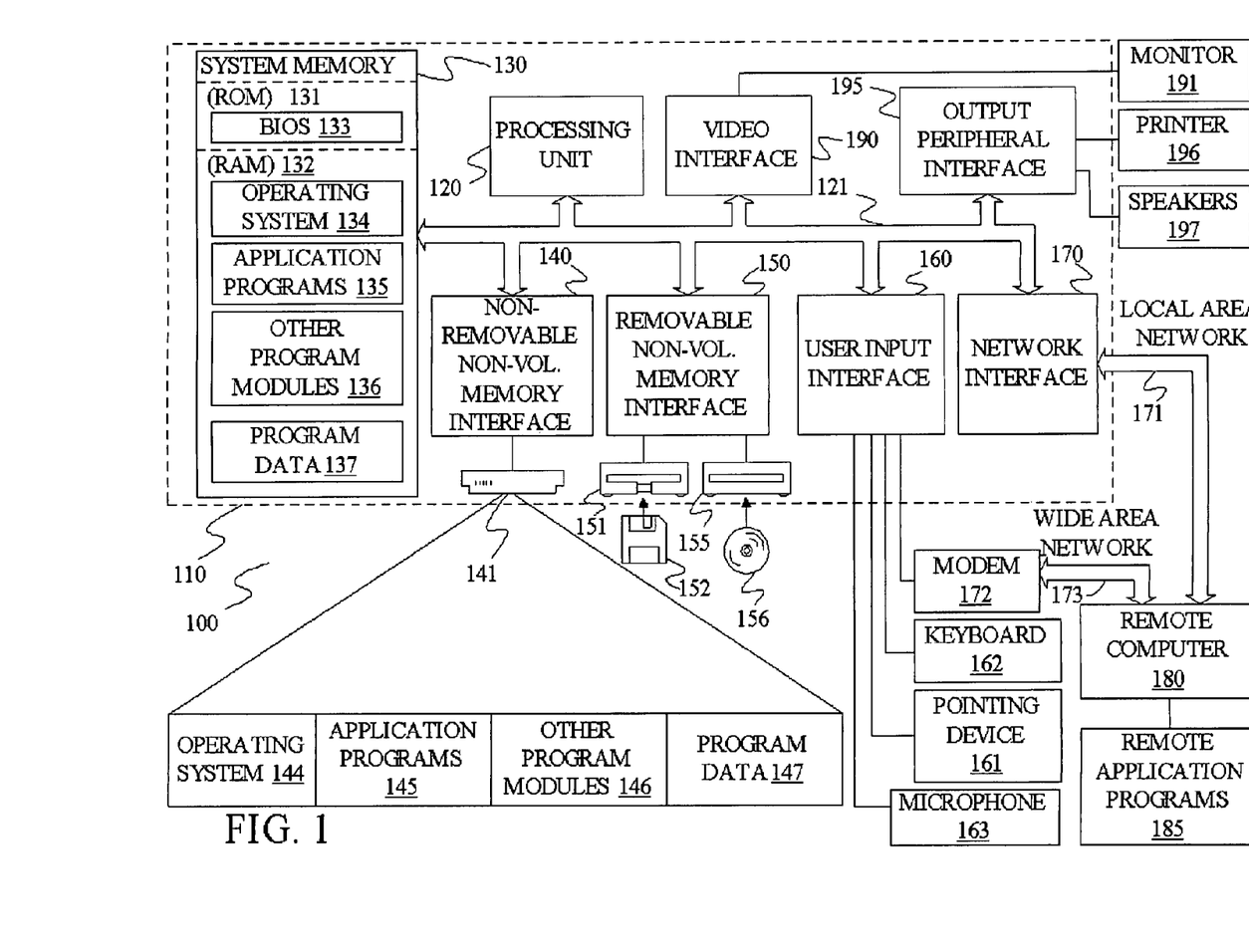
FIG. 1 is a block diagram of one computing environment in which embodiments of the present invention may be implemented.

FIG. 1 illustrates an example of a suitable computing system environment 100 within which embodiments of the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. Exemplary Information Retrieval System

Figure 2:
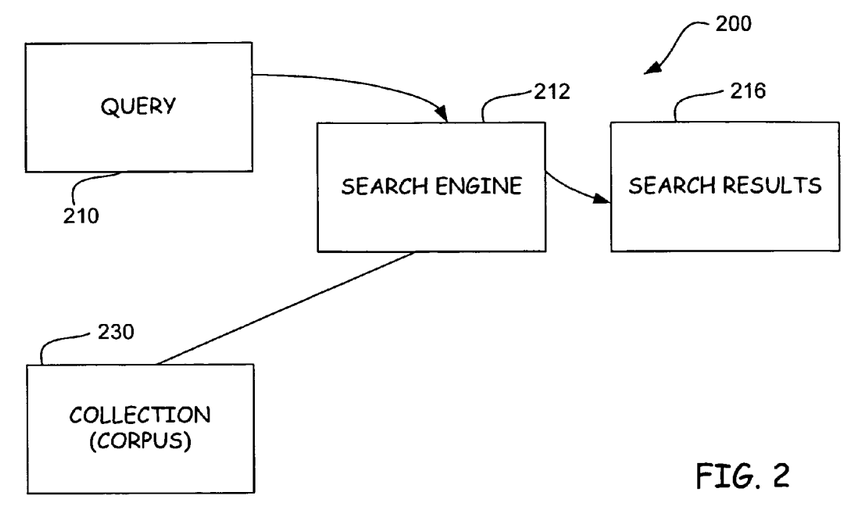
FIG. 2 is a schematic block diagram of an information retrieval system.

FIG. 2 illustrates a block diagram of one exemplary information retrieval system 200 with which embodiments of the present invention may be useful. A query 210 containing a user's search terms is entered into a search engine 212. Search engine 212 processes input query 210, and then applies the input to an available document collection or corpus 230 by searching for corresponding information in corresponding documents. Documents that qualify to be considered matching (or at least an indication of such documents) are returned to search engine 212. Relevant search results 216 are then provided to the user.

It is typical for search results 216 to be sorted utilizing a ranking algorithm. In many cases, the ranking algorithm is configured to compute the likelihood that a document containing search terms is the single document of interest. Once a likelihood is calculated and assigned to each document in a list, the entire list may be sorted according to the likelihood rankings. The resulting list is typically an ordered list where the document assigned the highest likelihood occurs first. The ranked documents (or at least an indication of the ranked documents) are returned to the user.

Information retrieval system 200 may be implemented as a server-based or client-side searching tool, or otherwise. Query 210 is illustratively, although not necessarily, a 'help query' submitted by the user of a software application. The help query 210 is submitted to search engine 212 in order to sort through a plurality of help documents (collection 230) to determine which documents (result set 216) may be most useful to facilitate completion of a task reflected in the terms of the query.

III. System for Improving Client-Side Searching

A few issues related to terminology should be addressed at this point. Those skilled in the art will appreciate that "query," as that term is utilized within the present description, is a generic term that includes a wide variety of potential search inputs that may originate from any of a wide variety of different sources. A query can arise in a variety of contexts such as, but not limited to, a search application, including a web site associated with a software application, or a network-connected client embedded in a software application. Another context potentially applicable to a query is search scoping, for example, when a user checks a box that limits the query. A query may, but not necessarily, comprise a particular search term or set of search terms. All other search inputs should be considered within the scope of the term "query," as that term is utilized within the present description. Also, any reference to a "search term" or "search terms" within the present description should be construed as actually including any search input, including search inputs other than a word or group of words.

The term "asset" is utilized within the present description to represent a designation of a document or some other item of content. For example, a help query in the form of "how to make my computer run faster" may correspond to the asset "How to defragment your hard drive," which is illustratively a unique designation or title of a help document.

It is also worth mentioning that, even though examples may be provided in the context of a help query system, the scope of the present invention is not so limited. A help query system provides an easy-to-understand example model of a search environment and is thus utilized within the present description to illustrate certain points and features. As those skilled in the art will appreciate, however, embodiments could just as easily be applied in a different context without departing from the scope of the present invention.

In accordance with one embodiment of the present invention, search terms affiliated with mappings or associations that represent a connection of relevancy between a query and an asset are pushed as content updates to a client system (e.g., as new updates or utilized to replace older data). The search terms are inserted (e.g., inserted as metadata) into corresponding content (the content associated with the asset). In this manner, content-searching data can be updated (e.g., remotely updated) as frequently as desired, even periodically, or selectively as new manually and/or automatically derived data becomes available. In another embodiment, the update data is already built into the content when it is delivered to a client machine. Those skilled in the art will be sympathetic to the fact that these and other similar updating methods are to be considered within the scope of the present invention.

Regardless of when and how the search terms are actually embedded in content, they illustratively become a part of the overall content that is crawled during a search process. This leads to a creation of 'hits' between a search term that is submitted by a user to the client system and the same search term that is embedded within the specific content (e.g., embedded as a query within the metadata). Thus, the submitted associations, in turn, improve search performance.

It should be noted that all similar and equivalent variations are to be considered within the scope of the present invention. For example, in one embodiment, entire association sets (i.e., indications of both queries and corresponding assets) are actually embedded in corresponding content to support searching updates. In another embodiment, however, only queries are embedded (i.e., metadata includes queries but no actual indication of corresponding assets). This is but one example of a simple variation that those skilled in the art will appreciate as being within the scope of the present invention. It should be noted that when the present invention refers to the processing and handling of "associations" or "search terms," the variations discussed in this paragraph are contemplated as alternatives.

Figure 3:
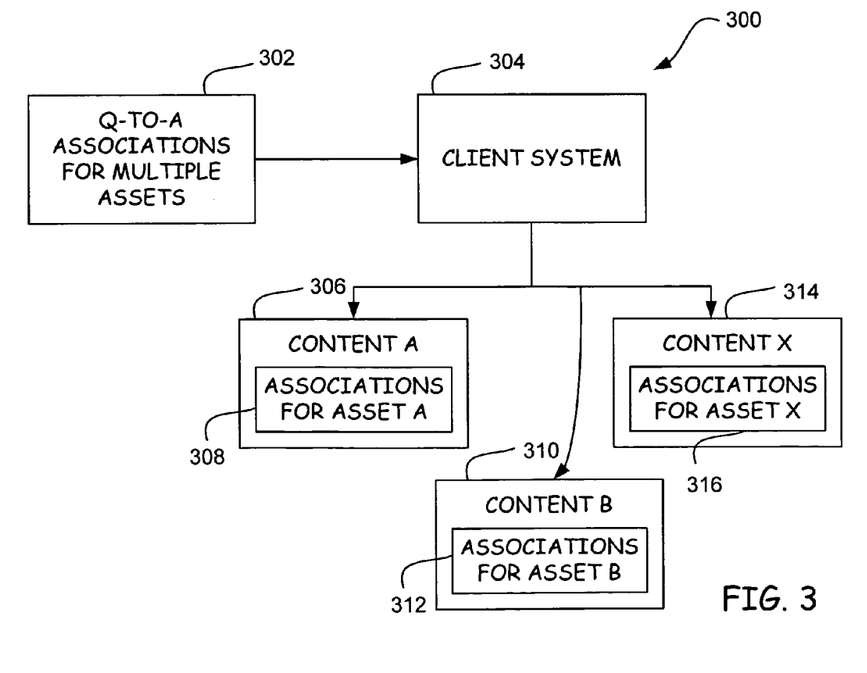
FIG. 3 is a schematic block diagram illustrating a search enhancement system.

FIG. 3 is a schematic block diagram demonstrating a search enhancement system 300. A client system 304 receives information related to a plurality of query-to-asset associations or mappings 302. Information 302 illustratively includes at least one query-to-asset association for a particular asset. Client system 304 is configured to distribute associations 302 (or at least the query components of the associations) to corresponding content.

In one embodiment, associations for a given asset are embedded (e.g., embedded within searchable metadata) within their corresponding body of content. Thus, associations 308, which correspond to asset A, are embedded within content A (identified as 306). Associations 312, which correspond to asset B, are embedded within content B (identified as 310). As a representation of multiple other potential bodies of content, associations 316, which correspond to asset x, are embedded within content x (identified as 314).

With further reference to FIG. 3, when a search request is processed by a related search engine (not shown), the corresponding search terms will be compared at least to association-related information embedded within each collection of content A, B and x. In this manner, the embedded association information will impact which collections of content are identified as corresponding to the search terms.

Those skilled in the art will appreciate that embodiments of the present invention include similar variations and equivalents as compared to what is specifically described herein. For example, as illustrated, the query-to-asset associations 302 appear to originate from a source outside of client system 304. In one embodiment, associations 302 are remotely transferred, such as from a server, or from a remote client computing system, or from a client system residing on the same client computing device upon which at least one of the content collections is stored. In another embodiment, however, associations 302 originate from within client system 304, regardless of the illustrated implementation. Similarly, the precise location and implementation of content A, B and x, whether remote or local, is also not a critical feature.

IV. Generation of Query-to-Asset Associations

Figure 4:
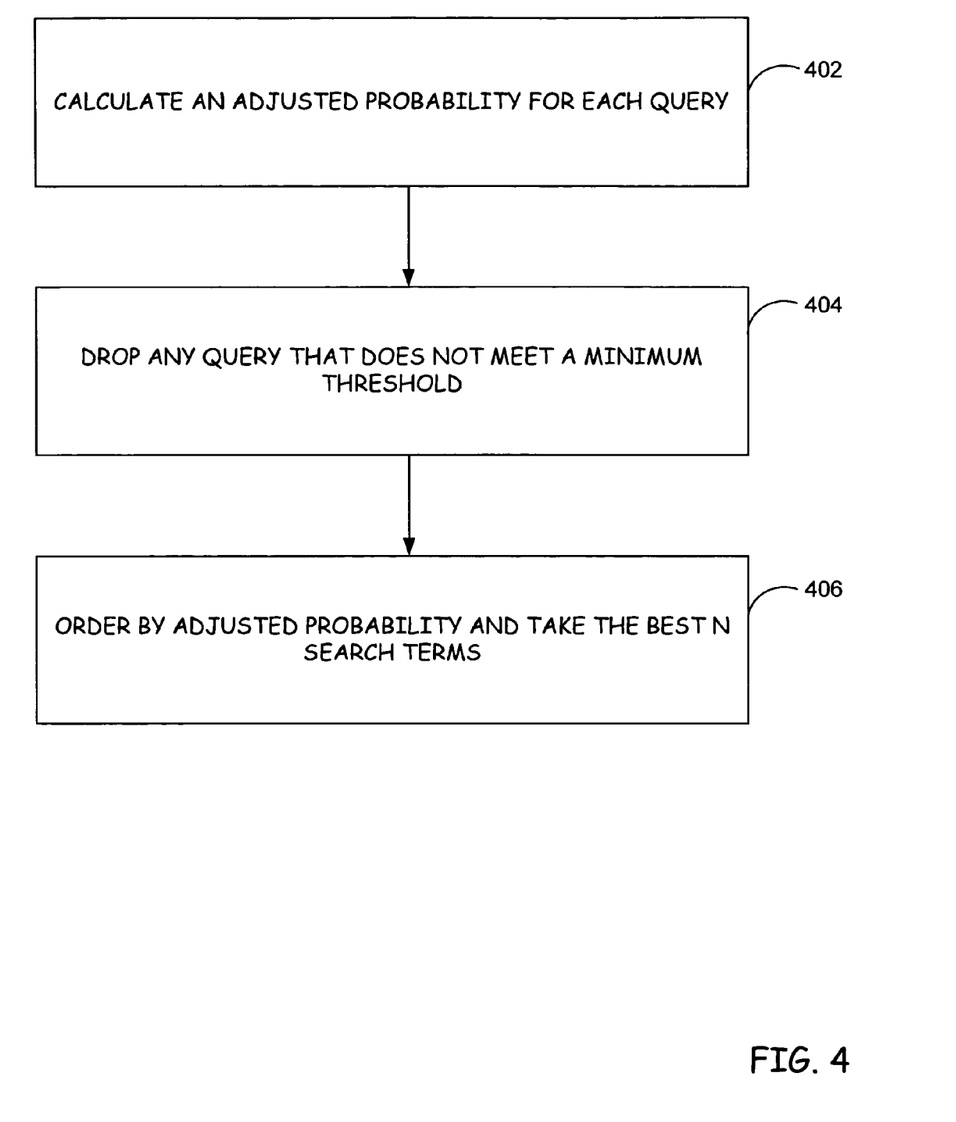
FIG. 4 is a flow chart representation of a method for extracting search terms from a data mining classification model.

FIG. 4 is a flow chart representation of a method for extracting update information from a data mining classification model. In one embodiment, the update information is utilized to update searching parameters of various items of content, as was described in relation to FIG. 3. The classification model illustratively includes, for each of a plurality of assets, one or more queries having an assigned probability that represents a likelihood of a relevant connection to the corresponding asset.

A first step, in accordance with block 402, is to calculate an "adjusted probability" for each query. The goal is to compute the probability that an asset is relevant given that the user searched with a given query q. In one embodiment, given the asset, an adjusted probability can be calculated using the following formula:

$$P_{adj}(a|q) = P_{pred}(a|q)/P_{marg}(q),$$

where a is an asset and q is a query.

The rationale behind dividing the predicted probability by the marginal probability is to penalize popular queries that might not be discriminative. Frequent query terms may not help to predict one asset over another. For example, the query term "the" may show up in many searches but it does not give much information about the intent of the user. In one embodiment, an alternate formula for $P_{adj}(a|q)$ penalizes frequent query terms based on a configurable constant c as follows:

$$P_{adj}(a|q) = P_{pred}(a|q) * (1 - P_{marg}(q))^{c/(1-c)}$$

No penalty is applied if c=0, while the maximum penalty is applied if c=1. A default value is configurable, for example, it might be set at c=0.85.

In accordance with block 404, a next step in the extraction process is to drop any query that does not meet a minimum $P_{pred}(a|q)$ (threshold is illustratively provided as a selectable parameter). Thus, queries are discarded if they do not meet a minimum probability threshold. Finally, in accordance with block 406, the top N search terms are selected, for example, in decreasing order of the adjusted probability. The value N is illustratively selectable as a parameter. In one embodiment, a full set of N search terms will not be extracted for each asset if there are not enough terms that show a strong predictive tendency for that asset.

Figure 5:
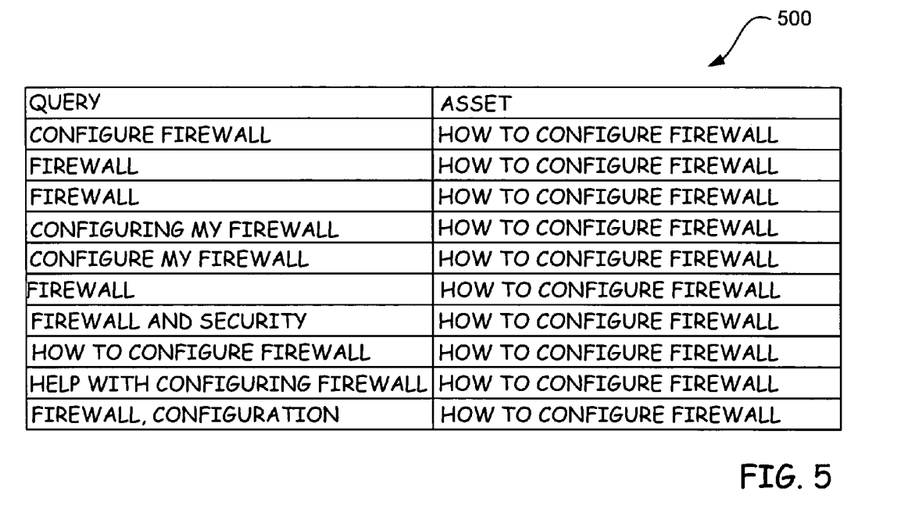
FIG. 5 is a table containing a list of ten query-to-asset associations.

FIG. 5 is an example table 500 containing a list of ten query-to-asset associations. The associations illustratively were derived in accordance with methods described in relation to FIG. 4. Table 500 illustratively supports an XML format such that the list can be conveniently transferred to a client system and directly inserted into corresponding content. Thus, the corresponding asset and related content will assumedly surface when a user enters one of the noted queries.

V. Blending of Associations

In one embodiment, a data mining classification model is generated so as to be a blended representation of associations having different characteristics and/or different originating sources. The precise nature of the associations being blended together is not a critical factor. In one embodiment, manually derived associations are blended with automatically derived associations. In another embodiment, two sets of automatically derived associations are blended. In another embodiment, two sets are blended wherein both sets include manually and automatically derived elements.

Thus, generally stated, a first input into the blending process is a first set of associations that can be utilized to train a data mining classification model. A second input is another set of associations that are to be blended with the first set. In one embodiment, a third input is an intention as to how the first and second sets are to be blended together, for example, but not by limitation, utilizing a rank-based approach or a weight-based approach.

While the scope of the present invention is not so limited, embodiments of the blending process will be described below in the specific context of blending automatically derived association candidates with manually derived association candidates. Manually derived candidates illustratively, although not necessarily, originate from an individual (e.g., a search author) using a tool to create associations between queries and assets. In one embodiment, an individual can express manual mappings in one of at least two different ways: rank-based or weight-based. For the purpose of simplifying the present description, the source of manual terms will be referred to as "the author." Automatically derived candidates illustratively, although not necessarily, are derived from processed user logs. In one embodiment, a database with an analysis component is configured to analyze trends, based on implicit and/or explicit user feedback, in requests for content (e.g., help content) to automatically generate the query-to-asset mappings or associations.

A rank-based expression of manual terms will be described first. In this case, the author's intentions are interpreted as being to put a particular query-to-asset association in a rank relative to other mappings that have been automatically derived. An author can, for example, specify that a particular manual association should be ranked 2nd behind a most probable automatically derived mapping. Suppose now that a data mining classifier based on automatically derived query-to-asset associations indicates that query "virus" maps to Asset1 (A1), Asset2 (A2), and Asset3 (A3) in decreasing order of probability. Given the parameter that the manual term should be ranked 2nd, adding a manual mapping "virus"->A4 would be interpreted as to change the data mining classifier to map "virus" to A1, A4, A2, A3 in decreasing order of probability.

Another alternative is a weight-based expression of manual terms. In this case, the author's intentions are interpreted as being to apply a relative weight for mapping. In accordance with one embodiment, the author specifies a weight as a number between 0 and 1. An author can, for example, specify that a particular manual association should be set to a weight of 0.5. Suppose now that a data mining classifier based on automatically derived query-asset associations indicates that query "virus" maps to A1 (probability or p=0.6), A2 (p=0.3), and A3 (p=0.1). The probability is taken as the weight. Adding a manual mapping, "virus"-> A4 with weight 0.5 would introduce A1 (w=0.6), A4 (w=0.5), A2 (w=0.3), and A3

(w=0.1), and the predicted probability changes to A1 (w=0.6/1.5), A4 (w=0.5/1.5), A2 (w=0.3/1.5), and A3 (w=0.1/1.5). The effect is that the new association or mapping could be recommended in any position depending on the probability of the other mappings.

Figure 6:
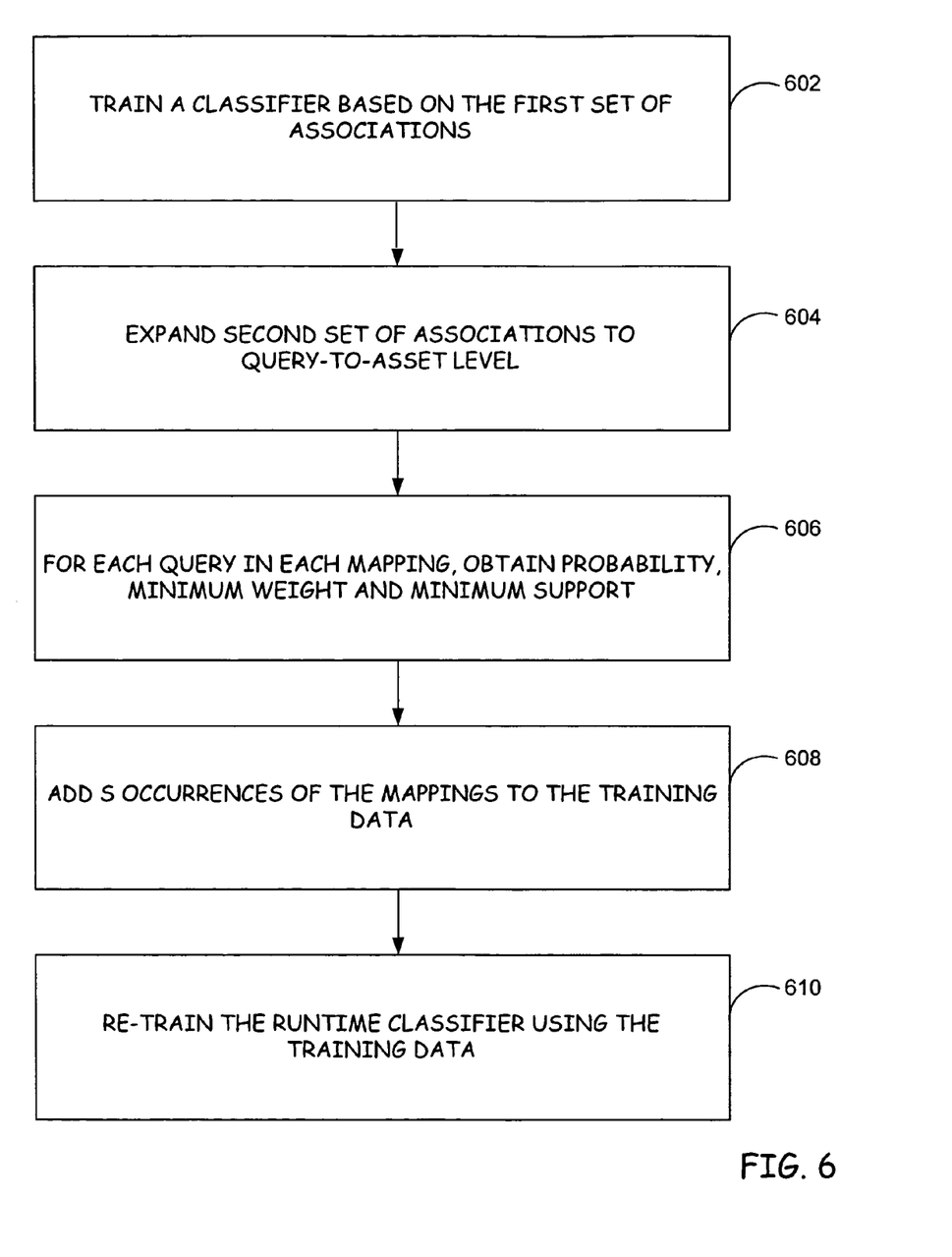
FIG. 6 is a flow chart representation of a method for generating a classification model that blends multiple sets of query-to-asset associations.

FIG. 6 is a flow chart representation of a method for training a classifier to blend manually and automatically derived association or mapping data. The first step, as is indicated by block 602, is to train a classification model based on the first set of associations. In the present example, this means preparing training data using only automatically derived association candidates; and then building a data mining classifier on top of the training data.

The second step, as is indicated by block 604, possibly an unnecessary step, is to expand the second set of associations to a query-to-asset representation. In the context of the present example, this means is to expand manually derived association data (i.e., author mappings) to a query-to-asset level. For the purposes of the present description, a mapping will be denoted as m(q,a), where q is a query and a is an asset.

In accordance with block 606, for each query q in each mapping m(q,a), a series of functions are performed. First, for each asset b, the probability of b given a query q, denoted P(b|q), is obtained from the data mining classifier ("P" indicates a probability). Next, a minimum weight, W, is calculated. If a fixed rank, r, is provided, then W is calculated as:

$$W = P(b_r|q), \text{ where } b_r \text{ is the r-th rank}$$

If a fixed weight is provided, then the minimum weight, W, is calculated as:
W=the fixed weight
Finally, the minimum support, S, is obtained for the mapping as follows:

$$S = (W - P(a|q)) * P(q) * T,$$

where T is the total number of training data

The next step, as is indicated by block 608, is to add S occurrences of the mappings m(q,a) to the training data. Then, as is indicated by block 610, the data mining classifier is re-trained using the expanded training data.

A specific example will help to illustrate operation of the described algorithm. A total number of training data (automated mappings only) is assumed to be equal to 10,000 cases. The classifier illustratively breaks down as follows (note, "P" indicates a probability):
P("virus")=0.01 (i.e., 100 cases)
P(A1|"virus")=0.4
P(A2|"virus")=0.3
P(A3|"virus")=0.2
P(A4|"virus")=0.1
For a manual mapping, m("virus",A4)
In a case of fixed rank=2:

$$W = P(A2|\text{"virus"}) = 0.3$$
$$S = (0.3 - P(A4|\text{"virus"})) * P(\text{"virus"}) * 10{,}000$$
$$= (0.3 - 0.1) * 100 = 20$$

Modified prediction:
P(A1|"virus")=40/120
P(A2|"virus")=30/120
P(A3|"virus")=20/120
P(A4|"virus")=30/120
In a case of fixed weight=0.5:

$$W = 0.5$$
$$S = (0.5 - P(A4|\text{"virus"})) * P(\text{"virus"}) * 10{,}000$$
$$= (0.5 - 0.1) * 100 = 40$$

Modified prediction:
P(A1|"virus")=40/140
P(A2|"virus")=30/140
P(A3|"virus")=20/140
P(A4|"virus")=50/140

Again, the scope of the present invention should not be construed as being limited to blending manually and automatically derived association sets. In another embodiment, associations (e.g., manually and/or automatically derived) produced in two separate information retrieval systems are blended. The first set of associations is illustratively the associations from system 1. The second set of associations is illustratively the associations from system 2. In one embodiment, the method to determine the intention is a weight-based method where the weight is a function of the weight given association by a classifier from system 2. Other variations are also within the scope of the present invention.

VI. Blending of Associations Prior to Term Extraction

In accordance with one embodiment, once a classifier is re-trained so as to become a blended representation of both sets of associations, it is utilized to extract search terms as was described in relation to FIG. 4.

VII. System Implementation

Figure 7:
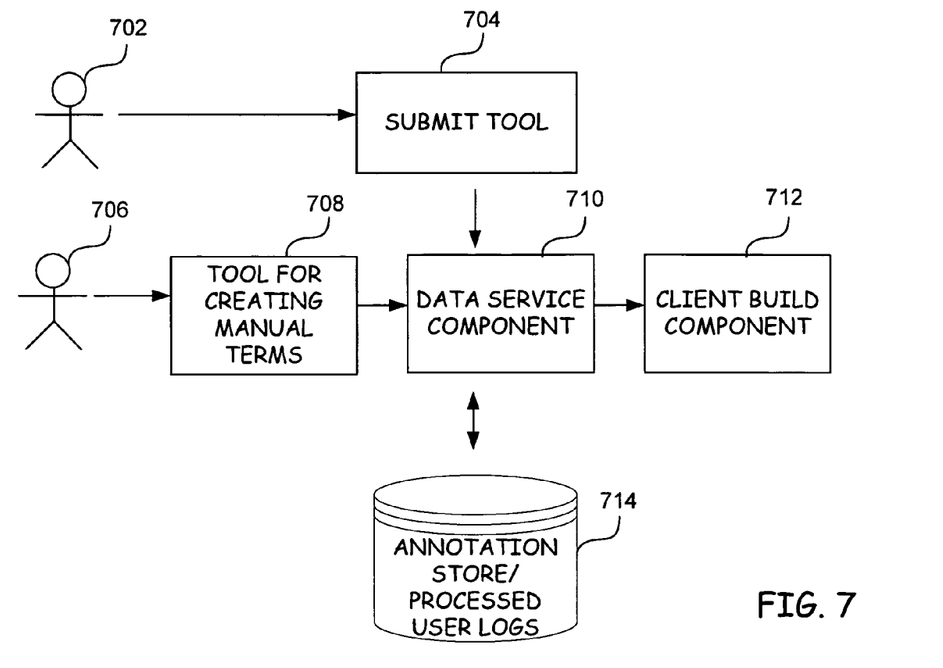
FIG. 7 is a schematic diagram demonstrating a high-level overview of a system for delivering query-to-asset associations.

FIG. 7 is a schematic diagram and represents one embodiment of a system for delivering query-to-asset associations for eventual incorporation into related content.

As was described in relation to FIG. 6, manually derived associations can be incorporated into updates for related content. In accordance with the system of FIG. 7, a person 706 utilizes a tool 708 to manually generate an association between one or more queries and a particular asset. These manually derived associations are submitted to a client build component 712 through a data service component 710. Client build component 712 facilitates the incorporation of the manually derived associations into searching updates to be delivered to corresponding content.

In one embodiment, person 706 is an author of a particular body of content, such as a help document. The author utilizes tool 708 to manually generate sets of terms that he/she perceives as being logically connected to the subject matter of the content so as to support an assumption that someone might search for the content based on those terms. The terms, illustratively in the form of one or more query-to-asset associations, are submitted to the client build component 712. These manually derived associations are then incorporated into searching updates to be delivered to corresponding content.

As was also described in relation to FIG. 6, automatically derived associations can be incorporated into updates for related content. In accordance with the system of FIG. 7, a second person 702 (although it could be the same person 706) utilizes a submit tool 704 to obtain automatically derived query-to-asset associations or mappings from an annotation store 714. These automatically derived associations are submitted to the client build component 712 through the data service component 710. Client build component 712 facilitates the incorporation of the automatically derived associations into updates for corresponding content.

Store 714 illustratively contains data such as, but not limited to, processed user logs that support the automatic derivations of query-to-asset associations. In accordance with one embodiment, store 714 includes a database with an analysis component configured to analyze trends, based on implicit and/or explicit user feedback, in requests for content (e.g., help content) to automatically generate the query-to-asset mappings or associations.

As was alluded to in Section VI of the present description, automatically and manually derived associations can be blended into a unitary collection of search terms to be used for content updating. In one embodiment, associations are submitted with tools 704 (automatically derived association candidates) and 708 (manually derived association candidates) through data service component 710 to client build component 712. Both sets of associations are illustratively accounted for in a derivation of a unified set of search terms or associations for a given asset (as alluded to in Section VI). This unified set of data (e.g., in the form of XML data similar to FIG. 5) is inserted into corresponding documents or other items of content so that it will be crawled during a search process.

In accordance with one embodiment, submit tool 704 is implemented as a command-line tool that extracts and submits data, for example, from annotation store 714. Submit tool 704 illustratively enables builder 702 to push query-to-asset associations or mappings to the client build component 712 so they can be incorporated into the content updating process. The associations or mappings are illustratively incorporated into metadata that is generated and eventually inserted into corresponding content so it can be crawled during a search.

The inputs for supporting the functionality of the data submit tool 704 are illustratively implemented as environment parameters. The parameters illustratively include:

Designating client or server to which the data transfer will be targeted (-e)

Designating the path where the XML file is to be stored, meaning the XML file to eventually be used to update content (-p)

Designating the catalog, meaning an indicator of the language or cultural characteristics of the data being transferred (-c)

Designating what needs to get pushed to the client/server as part of the data transfer (-s)

Designating the file name of the XML file (-f)

In one embodiment, the searchable enhancements pushed to become content updates will include Best Bets (BB), which are illustratively query-to-asset associations that will likely fall at the beginning of a result set. In another embodiment, the enhancements will also or alternatively include general search terms (ST), such as search terms generated using the extraction and/or blending algorithms described herein.

It should be noted that while the filename may be restricted, the path is illustratively configurable. An example of what one might enter into the command line to push search-authored data and design terms to the client is as follows:

```
SubmitTool -e client -s BB,ST -c english-us-
   f\\Servername\CSbuild\ClientStuff
```

In one embodiment, the file is hard-coded. The user then will only need to input locations as a parameter, and the file will be automatically written using the filename. In one embodiment, the output for the submit tool feature is an asset-oriented object, including Best Bets and/or Search Terms that will be used to create an XML file to pass to the client system to be incorporated into associated content.

In accordance with another embodiment, submit tool 504 is implemented as a GUI tool that implements the same functionality as the command-line tool described above, but with a graphic user interface guiding a user to provide the necessary parameters.

Although the present invention has been described with reference to particular embodiments, workers skilled in the art will recognize that changes may be made in form and detail without departing from the spirit and scope of the invention.

What is claimed is:

1. A computer-implemented method for updating the basis upon which a plurality of assets are searched, the method comprising:

utilizing a processor that is a functional component of the computer to train a data mining classification model to statistically account for multiple sets of query-to-asset associations, a first one of the sets in the multiple sets originating from a first source and a second one of the sets in the multiple sets originating from a second source, each query-to-asset association in the multiple sets representing a connection of relevancy between a query and an asset, each query being a potential search input and each asset being an item of content;

utilizing the classification model as a basis for extracting sets of search terms for each of the plurality of assets, the extracting including performing a plurality of functions, the plurality of functions including calculating for each of the assets a probability of the asset given a particular search term, a minimum weight, and a minimum support value;

incorporating at least one of the extracted sets of search terms into a content update for each of the plurality of assets, the content update being added to what is considered when relevancy is evaluated during a search process, the search process returning search results that are sorted utilizing a ranking algorithm, the ranking algorithm computing a likelihood that an asset corresponding to a search term is a single asset of interest, the search results being sorted based at least in part upon likelihood rankings; and wherein, for each of the plurality of assets, incorporating the at least one of the extracted sets of search terms into a content update comprises inserting the set of search terms into the content of the particular asset such that the search terms will be considered by a search engine when the content of the particular asset is evaluated against a user's search input, wherein for each of the plurality of assets the search engine compares the search terms to the content of the particular asset, and wherein the search engine identifies the search results as being a set of the plurality of the assets that corresponds to the search terms.

2. The method of claim 1, wherein the first one of the sets comprises manually derived query-to-asset associations, the manually derived query-to-asset associations originating from a search author using a tool to create associations between queries and assets, and wherein the search results are an ordered list in which a document assigned a highest likelihood occurs first.

3. The method of claim 2, wherein training comprises training the classification model to statistically account for the manually derived query-to-asset associations expressed in a rank-based format, the rank-based format comprising putting the manually derived query-to-asset associations in a rank relative to other mappings, and wherein the user's search input is a help query submitted by a user of a software application, the help query submitted to the search engine to sort through a plurality of help documents to determine documents that are useful to facilitate completion of a task within the software application, the task corresponding to the user's search input.

4. The method of claim 2, wherein training comprises training the classification model to statistically account for the manually derived query-to-asset association expressed in a weight-based format, the weight-based format comprising a user specified value that is utilized in adjusting predicted probabilities, and wherein the search process is implemented as a server-based searching tool.

5. The method of claim 1, wherein the first one of the sets and the second one of the sets both include automatically derived query-to-asset associations, the automatically derived query-to-asset associations being derived from processed user logs that include user feedback, the user feedback including implicit and explicit feedback, and wherein the search process is implemented as a client-side searching tool.

6. The method of claim 1, wherein the first one of the sets includes automatically derived components and the second one of the sets includes manually derived components, wherein the classification model is first trained utilizing the automatically derived components, and wherein, upon the classification model being trained utilizing the automatically derived components, a data mining classifier is built on top of the automatically derived components.

7. The method of claim 1, wherein the first one of the sets includes associations from a first information retrieval system, and wherein the second one of the sets includes associations from a second information retrieval system.

8. The method of claim 1, wherein incorporating one of said sets of search terms comprises remotely transferring the one said set of search terms from a server to a client system, and wherein the data mining classifier provides, for each of the plurality of assets, a probability of the asset being relevant given a particular query.

9. The method of claim 8, wherein remotely transferring comprises automatically remotely transferring based upon new data becoming available.

10. The method of claim 1, wherein inserting the set of search terms into the content of the particular asset comprises replacing existing data, wherein the content update includes a table having a plurality of columns and rows, wherein one of the plurality of columns includes a list of queries and another one of the plurality of columns includes a list of assets, and wherein at least two of the plurality of rows correspond to a same asset but a different query.

11. A computer-implemented method for updating the basis upon which a plurality of assets are searched, the method comprising:
utilizing a processor that is a functional component of the computer to train a data mining classification model to statistically account for a set of query-to-asset associations, each query-to-asset association representing a connection of relevancy between a query and an asset, each query being a potential search input and each asset being an item of content, wherein training the classification model comprises training a data mining classifier based on a data set that includes a manually derived query-to-asset association blended, based on a minimum support value, into automatically derived training data, the minimum support value, S, being calculated using a formula:

$$S=(W-P(a|q))*P(q)*T,$$

where W is a fixed weight, P(a|q) is the probability of an asset a given the query q, P(q) is the probability of q, and T is the total number of training data, wherein S occurrences of mappings m(q, a) are added to training data to form an expanded set of training data, and wherein the data mining classifier is re-trained utilizing the expanded set of training data;
utilizing the classification model as a basis for extracting sets of search terms for each of the plurality of assets;
incorporating one of said sets of search terms into a content update for each of the plurality of assets, the content update being added to what is considered when relevancy is evaluated during a search process, the search process returning search results that are sorted utilizing a ranking algorithm, the ranking, algorithm computing a likelihood that an asset corresponding to a search term is a single asset of interest, the search results being sorted based at least in part upon likelihood rankings; and
wherein, for each of the plurality of assets, incorporating one of said sets of search terms into a content update comprises inserting the set of search terms into the content of the particular asset such that the search terms will be considered by a search engine when the content of the particular asset is evaluated against a user's search input, wherein for each of the plurality of assets the search engine compares the search terms to the content of the particular asset, and wherein the search engine identifies the search results as being a set of the plurality of the assets that corresponds to the search terms.

12. The method of claim 11, wherein utilizing the classification model as a basis for extracting a set of search terms further comprises, for each of the plurality of assets, utilizing the classification model as a basis for extracting a set of best search terms, wherein incorporating one of said sets of search terms into a content update comprises including the set of best search terms in an XML file that is transferred to a client system, wherein the XML file is transferred to the client system utilizing a data submit tool, the data submit tool having inputs that support its functionality and that are implemented as environment parameters.

13. The method of claim 11, wherein incorporating one of said sets of search terms into a content update for each of the plurality of assets further comprises incorporating one of said sets of search terms into a metadata content update that is embedded in each of the plurality of assets, the metadata content updates being hard-coded and transferred to a client utilizing a command-line tool, and wherein a user only specifies input locations as parameters and the metadata content updates are automatically written.

14. A computer-implemented method for updating the basis upon which a plurality of assets are searched, the method comprising:
utilizing a processor that is a functional component of the computer to train a data mining classification model to statistically account for a set of query-to-asset associations, each query-to-asset association representing a connection of relevancy between a query and an asset, each query being a potential search input and each asset being an item of content;
utilizing the classification model as a basis for extracting sets of search terms for each of the plurality of assets wherein utilizing the classification model to extract a set of search terms comprises:
determining, based on application of the classification model, an adjusted probability value that represents a probability that a particular asset is relevant given a user search based on a first query associated with the particular asset, the adjusted probability value being calculated using a formula:

$$P_{adj}(a|q) = P_{pred}(a|q)/P_{marg}(q),$$

where a is an asset, q is a query, $P_{adj}$ is the adjusted probability, and $P_{marg}$ is the marginal probability; and utilizing the adjusted probability value as a basis for evaluating whether to include the particular query in the set of search terms, wherein the adjusted probability value is compared to a minimum threshold value, the minimum threshold value being a selectable parameter, and wherein the particular query is eliminated if it does not meet the minimum threshold value;

incorporating one of said sets of search terms into a content update for each of the plurality of assets, the content update being, added to what is considered when relevancy is evaluated during a search process, the search process returning search results that are sorted utilizing a ranking algorithm, the ranking algorithm computing a likelihood that an asset corresponding to a search term is a single asset of interest, the search results being sorted based at least in part upon likelihood rankings; and wherein, for each of the plurality of assets, incorporating one of said sets of search terms into a content update comprises inserting the set of search terms into the content of the particular asset such that the search terms will be considered by a search engine when the content of the particular asset is evaluated against a user's search input, wherein for each of the plurality of assets the search engine compares the search terms to the content of the particular asset, and wherein the search engine identifies the search results as being a set of the plurality of the assets that corresponds to the search terms.

15. The method of claim 14 further comprising penalizing the adjusted probability value if there is an indication that the first query might not be discriminative, the penalized adjusted probability value being calculated using a formula:

$$P_{adj}(a|q) = P_{pred}(a|q) * (1 - P_{marg}(q))^{c/(1-c)},$$

where c is a configurable constant, wherein no penalty is applied upon c being set to a value of zero, and wherein a maximum penalty is applied upon c being set to a value of one.

16. The method of claim 15, wherein c is set to a default value that is between zero and one.

17. The method of claim 14 wherein utilizing the adjusted probability value as a basis for evaluating whether to include the particular query in the set of search terms comprises:

obtaining a plurality of other adjusted probability values that correspond to a plurality of other queries associated with the particular asset, the plurality of other queries having a plurality of originating sources; and from the first and other queries associated with the particular asset, selecting a limited set of queries to be included in the set of search terms, the limited set being comprised of the queries having the highest adjusted probability values, the limited set being selected in decreasing order of the adjusted probability values, and wherein a number of queries within the limited set of queries is selectable as a parameter.

* * * * *

UNITED STATES PATENT AND TRADEMARK OFFICE
CERTIFICATE OF CORRECTION

PATENT NO. : 8,019,758 B2
APPLICATION NO. : 11/157553
DATED : September 13, 2011
INVENTOR(S) : Zijian Zheng et al.

It is certified that error appears in the above-identified patent and that said Letters Patent is hereby corrected as shown below:

Title page, item (75), under "Inventors" column 1, line 2, after "Behr" insert -- Jr. --.

In column 14, line 17, in Claim 11, delete "ranking," and insert -- ranking --, therefor.

In column 15, line 18, in Claim 14, delete "being," and insert -- being --, therefor.

Signed and Sealed this
Twenty-fifth Day of October, 2011

David J. Kappos
*Director of the United States Patent and Trademark Office*